April 5, 1960 M. D. PRINCE 2,932,017
DIGITAL TO ANALOG CONVERTER AND METHOD
Filed Aug. 12, 1955 2 Sheets-Sheet 1
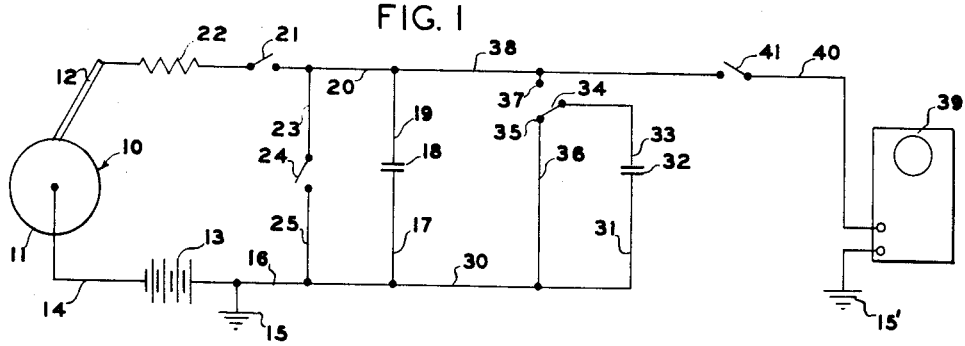
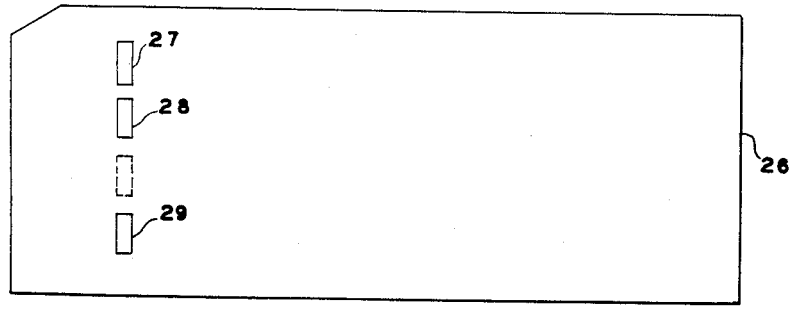
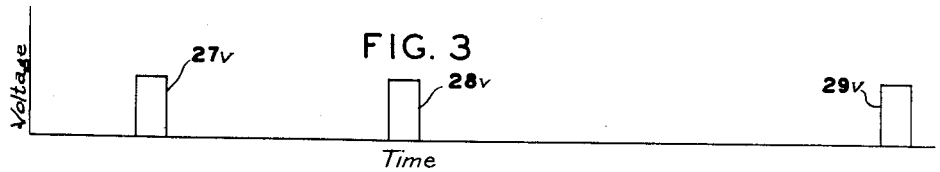
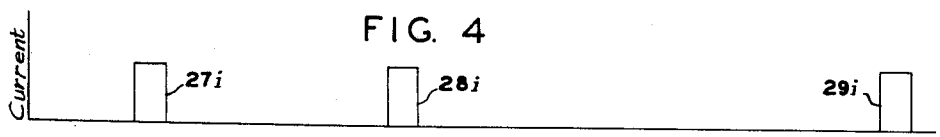
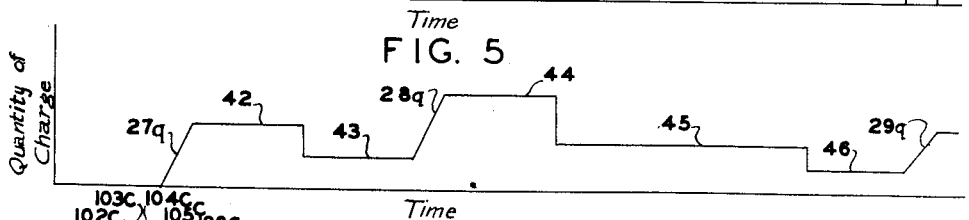
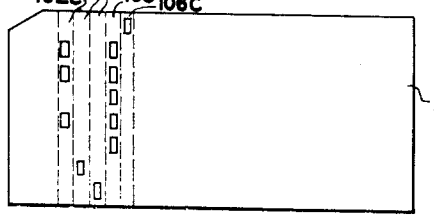
INVENTOR.
MORRIS DAVID PRINCE
BY
ATTORNEY

INVENTOR.
MORRIS DAVID PRINCE
BY
ATTORNEY

United States Patent Office 2,932,017
Patented Apr. 5, 1960

2,932,017

DIGITAL TO ANALOG CONVERTER AND METHOD

Morris David Prince, Chamblee, Ga., assignor to Georgia Tech Research Institute, Atlanta, Ga., a corporation of Georgia Application August 12, 1955, Serial No. 527,908

10 Claims. (Cl. 340—347)

This invention relates to electrical converters and more particularly to a digital to analog converter and a method of effecting such conversion.

Under many circumstances, it is most desirable to provide for ready and automatic conversion from a digital system to analog system. For example, lathes and other automatic machinery have been developed wherein a predetermined setting is imparted to the machine by a servo mechanism which is essentially an analog device. As another example, the coded answers calculated by digital computers must be placed in analog form for plotting purposes. With a converter such as contemplated herein, the predetermined setting may be stored on cards which are fed through digital machines, the pulse so generated by the digital machine being then converted into a single voltage or amperage, the magnitude of which is utilized by the servo mechanism. Other and varied uses of such a converter suggest themselves to those skilled in the art.

Briefly, my digital to analog converter concerns the conversion of a number, having a digital pulse energy notation in the form of no-energy for zero-value digits and value-energy for value digits, to an analog voltage, and includes two or more storage zones or condensers wherein a quantity of energy is stored in a first zone or condenser in proportion to the pulse energy notation received from a digital machine. A predetermined fraction of this stored energy is then transferred to a second storage zone or condenser. The energy thus placed in the second storage zone or condenser is then dissipated or released. Next, a second amount of energy is stored in the first storage zone or condenser in addition to that amount already contained therein, then the predetermined fraction of this total energy is transferred to the second zone or condenser which again is subsequently dissipated. This operation is repeated until the information is completely stored. Thereafter, the energy in the first zone condenser is utilized to operate an analog device.

Accordingly, it is an object of my invention to provide a digital to analog converter wherein a number, having a series-coded digital pulse quantity notation in the form of no-quantity for zero-value digits and value-quantity for value digits, is converted into a magnitude of energy or voltage corresponding thereto.

Another object of my invention is to provide a digital to analog converter which will quickly and automatically convert the output of a digital machine into a magnitude suitable for input to an analog machine.

Another object of my invention is to provide a digital to analog converter which operates independently of the timing and spacing between pulses of the digital machine.

Another object of my invention is to provide a digital to analog converter which is inexpensive to manufacture, durable in structure, efficient in operation, and requires only a few moving parts.

Another object of my invention is to provide an inexpensive and accurate method and means of converting the signals of a digital machine into energy suitable for input into an analog machine.

Another object of my invention is to provide a pair of storage zones which, in combination, will perform the operation of storage of pulses and will perform the operation of division of the stored quantity by a fixed number, either operation being performed successively any desired number of times and the two operations being performed alternately in any desired order.

Another object of my invention is to provide a device for reducing a stored charge, and hence a stored voltage, to a given fraction of its former value, any desired number of times in succession.

Another object of my invention is to provide two or more storage zones which, in combination, will sum (integate) an analog quantity for any desired length of time and which will then divide the accumulated sum by one or more preselected numbers, the division being performed successively any desired number of times, the division operation and the summing operation being performed alternately in any desired order.

Other and further objects and advantages of my invention will become apparent from the following description when taken in conjunction with the accompanying drawings in which like characters of reference designate corresponding parts throughout the several views, and wherein:

Fig. 1 is a schematic wiring diagram showing the simplified components of my digital to analog converter and showing its connection between a digital machine and an analog machine.

Fig. 2 illustrates a conventional card which is fed into the digital machine illustrated in Fig. 1.

Fig. 3 is a voltage vs. time plot of the digital machine shown in Fig. 1 when it receives the card shown in Fig. 2.

Fig. 4 is a current vs. time plot of the electricity received by the first condenser of the circuit shown in Fig. 1 when the card shown in Fig. 2 is fed through the digital machine shown in Fig. 1.

Fig. 5 is a charge vs. time plot of the quantity of electricity stored in the first condenser shown in Fig. 1, as the card shown in Fig. 2 is fed through the digital machine of Fig. 1.

Fig. 7 illustrates a conventional card which is fed into the digital machine illustrated in Fig. 6.

Figure 6:
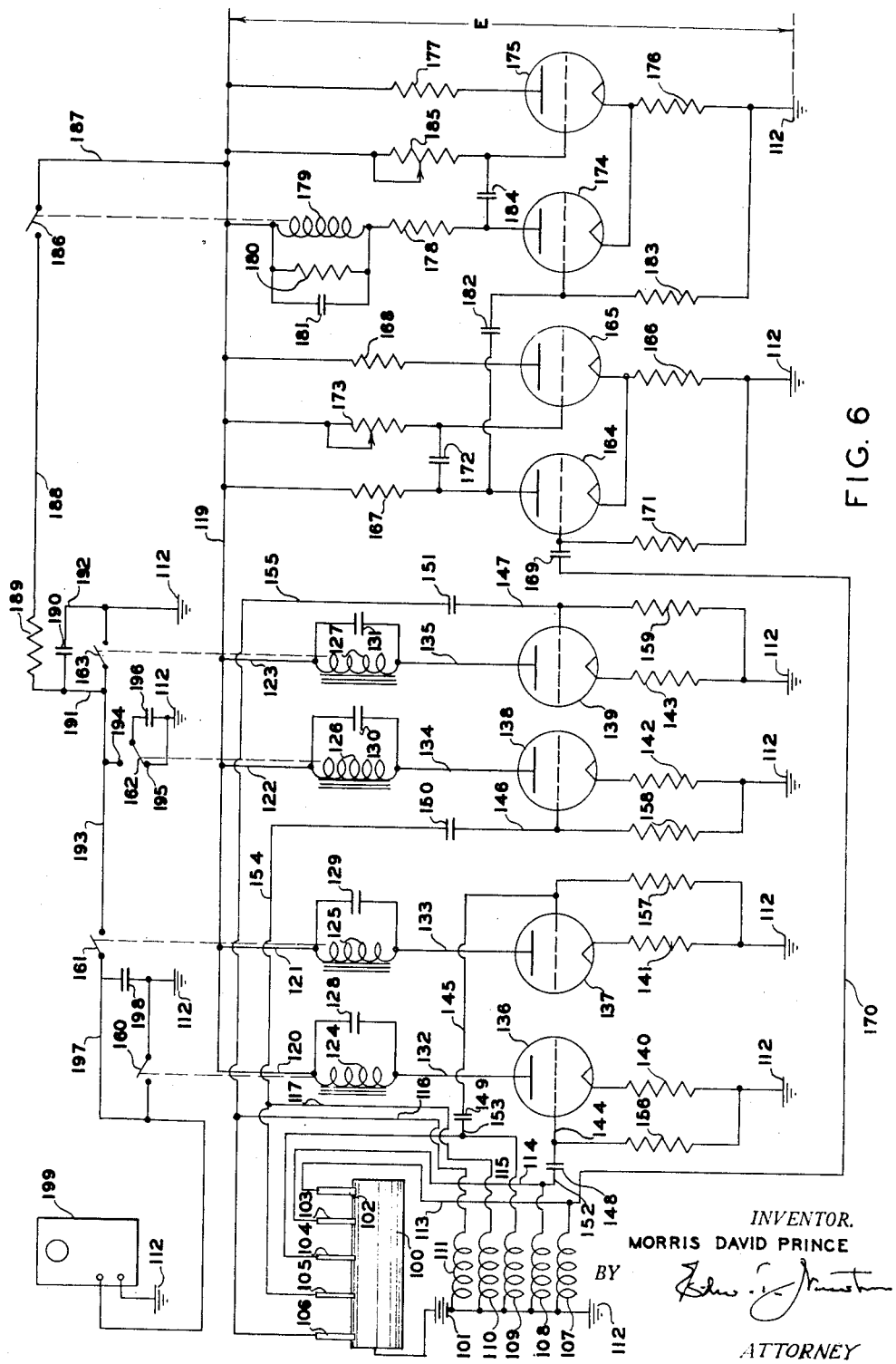
Fig. 6 is a wiring diagram of a second embodiment of my invention showing the digital to analog converter and automatic control circuitry for automatic storage of the input from the digital machine and automatic output to the analog machine.

For purpose of illustrating my invention in a simple application, I have selected as a representative digital machine, an electric punched card accounting machine of the type which is manufactured by International Business Machines Corporation of New York, N.Y., and which is more specifically described as "Type 514." As representative of analog machines, I have selected a conventional oscilloscope which is more specifically described as a "Tektronix Type 315" oscilloscope. It will be understood however that the present invention is in no way limited in its function to the conversion of data from the specific digital machine to the specific analog machine disclosed herein. Instead, it is anticipated that the present invention has wide and varied application to various machines and for various functions.

It will be understood that in its broad concept of the present invention, it is applicable to the storage of data in magnetic, hydraulic, pneumatic and other forms, as well as the electrical system described hereinafter.

Referring now in detail to the embodiments chosen for purpose of illustration, numeral 10 denotes generally a digital machine of the type having a rotating drum 11 which is electrically conductive. A brush 12 is so positioned with respect to drum 11 that the tip of the brush 12 may electrically contact the periphery of drum 11.

A source of current denoted by battery 13 supplies current from one terminal to drum 11 through wire 14. The other terminal of battery 13 is grounded at 15 and also leads through wires 16 and 17 to one plate of first condenser 18 which acts as the first storage zone. From the other plate of condenser 18, wires 19 and 20 lead through switch 21 to a resistor 22 having a high resistance which in turn is connected to brush 12 to complete a circuit through the drum 11 and wire 14 to battery 13 when switch 21 is closed.

A discharging circuit for condenser 18 is connected between wires 16 and 20 and includes a wire 23 leading from wire 20 to one side of switch 24, and a wire 25 leading from the other side of switch 24 to wire 16. Switch 24 is normally open except when it is desired to discharge condenser 18 to ground 15.

As is conventional in digital machines of this type, when a card, such as card 26 in Fig. 2, is fed into the machine between brush 12 and drum 11, the brush 12 contacts drum 11 each time a punched out place such as openings 27, 28 and 29 pass beneath the brush. Thus, if card 26 were fed into the digital machine 10, three separate pulses of equal voltage and equal duration would be imparted to the circuit described above, and a charge equivalent to each of the three pulses would be stored in condenser 18.

It is important that the resistance value of resistor 22 be large compared with the impedance of condenser 18 so that, when switch 21 is closed and brush 12 is contacting drum 11, the current through resistor 22 and into condenser 18 will be approximately the battery voltage of battery 13 divided by the resistance of resistor 22. It is also important that the total voltage on condenser 18 shall not exceed a small fraction of the voltage of battery 13 so that the charging characteristics of condenser 18 will remain substantially linear.

For transferring a proportional quantity of current to a second zone, a wire 30 is connected at the junction of wires 16 and 17, and this wire is electrically connected through wire 31 to one plate of a second condenser 32. The other plate of second condenser 32 is connected through wire 33 to the throw arm of a single pole double throw switch 34. Contact terminal 35 of switch 34 is connected through wire 36 to wire 30, and contact terminal 37 of switch 34 is connected through wire 38 to the junction of wires 19 and 20.

It is thus seen that after one opening, such as 27, on a card, such as card 26, has passed through digital machine 10, to thereby charge condenser 18, switch 34 may be thrown from its normal position contacting contact terminal 35 to its charging position contacting terminal 37, thereby completing a circuit between condensers 18 and 32. This operation will cause the charge on condenser 18 to distribute itself between condensers 18 and 32 in proportion to the capacitance of the respective condensers.

To receive the output of my converter, an analog machine, such as oscilloscope 39, is connected to the converter with the Y-input terminal of the oscilloscope 39 being connected through wire 40 and switch 41 to wires 33. The X-input terminal of oscilloscope 39 is connected to ground 15'.

Operation of the embodiment of Fig. 1

In any numerical system wherein discrete numbers are utilized, a number may be written as $abcdef$ which is an abbreviation for $an^5+bn^4+cn^3+dn^2+en^1+fn^0$, where $n$ is the base of the number system. Thus a number written using the binary notation in form $abcdef$, represents $a2^5+b2^4+c2^3+d2^2+e2^1+f2^0$, where each letter $a$, $b$, $c$, $d$, $e$, and $f$ denotes either a 0 or a 1. If a voltage V proportional to this number is desired, the following form may be used:

$$V = K2^5 (a+b2^{-1}+c2^{-2}+d2^{-3}+e2^{-4}+f2^{-5})$$

This voltage V may be synthesized by the following steps, taking the least significant digit first:

$V_0 = f$
$V_1 = e + f2^{-1}$
$V_2 = d + e2^{-1} + f2^{-2}$
$V_3 = c + d2^{-1} + e2^{-2} + f2^{-3}$
$V_4 = b + c2^{-1} + d2^{-2} + e2^{-3} + f2^{-4}$
$V_5 = a + b2^{-1} + c2^{-2} + d2^{-3} + e2^{-4} + f2^{-5}$

Note that each successive voltage is obtained by weighting the preceding voltage value by dividing it by two, and then adding the next digit. Voltage $V_5$ thus produced is proportional to the binary number, $abcdef$.

The above described procedure is carried out by my apparatus. When a binary numerical digital machine is used as digital machine 10, the capacity of condenser 18 is chosen equal to that of condenser 32. Of course, if a decimal system of digital machine is utilized, condenser 32 should have nine times the capacity of condenser 18 to thereby receive 9/10ths quantity of charge each time the condensers are paralleled; however, here, by way of explanation, a binary system is employed.

When the machine shown in Fig. 1 is placed in operation switch 21 is closed, switch 24 open, switch 34 is in its normal position against terminal 35, and switch 41 is open. Card 26 is fed into the digital machine 10 and as opening 27, representing the least significant digit, passes beneath brush 12, a current of a certain amperage and duration flows from battery 13, through drum 11, through brush 12, resistor 22, switch 21, wire 20, wire 19, to charge condenser 18. It is to be remembered that the other plate of condenser 18 is connected through wires 17 and 16 to the other terminal of battery 13. The initial voltage thus caused on brush 12 is shown by plot $27v$ in Fig. 3 and the current flowing at this time is shown in plot $27i$ of Fig. 4; thus a certain quantity of electricity is stored in condenser 18 as is denoted by line $27q$ in Fig. 5.

Between the time the first position on card 26 has passed brush 12 and before the second position is reached, brush 12 is insulated from drum 11 by the card portion between openings 27 and 28. During this time lapse, condenser 18 has a charge indicated by line 42 in Fig. 5; however, switch 34 is thrown to its charging position with switch 34 closed against terminal 37. Thus, condenser 18 discharges to condenser 32 until the charges on the two condensers are equalized, it being remembered that in the present instance the capacity of the two condensers are the same. At this point of the time cycle, condenser 18 has the quantity of charge indicated by line 43 in Fig. 5 which is one-half the original value imparted to it.

After the charges on the two condensers 18 and 32 are equalized and before opening 28 passes beneath brush 12, switch 34 is returned to the position where it contacts terminal 35 in that order to discharge condenser 32 to ground 15.

As opening 28 passes beneath brush 12, a second pulse is imparted to condenser 18, the pulse voltage being indicated by plot $28v$ in Fig. 3, the pulse amperage being indicated by plot $28i$ in Fig. 4 and the charge on condenser 18 being indicated by line $28q$ in Fig. 5. When opening 28 has passed beneath brush 12, the charge on condenser 18 is indicated by line 44 in Fig. 5. Next, the cycle is repeated by closing switch 34 against terminal 37 so that the charge on the condenser 18 is again equally distributed between the two condensers, the switch 34 then being moved to the position where it contacts terminal 35 to discharge condenser 32 to ground 15.

At this point in the time cycle, as indicated by line 45, condenser 18 has one-half the charge that it previously had, the remaining one-half charge being grounded from condenser 32 as described above.

By way of example, the next portion of card 26 in its travel under brush 12 is not punched, hence brush 12 is insulated from drum 11 during this cycle; however, by the closing of switch 34 against terminal 37, and then returning it to terminal 35, one-half of the charge on condenser 18 is dissipated, with the remaining one-half charge being retained by condenser 18. This condition of charge is indicated by line 46 in Fig. 5.

The next position of card 28 in its travel under brush 12 has been punched as indicated by opening 29; thus, in this last cycle, voltage 29v, causing amperage 29i, is imparted to condenser 18 as described above, except that in this instance after switch 34 is closed against terminal 37, switch 41 is also closed so that the total voltage across condenser 18 is imparted to analog machine 39. Since $Q=CV$, where Q is the quantity of charge, C is the capacity of the condensers 18 and 32, and V is the voltage, a voltage corresponding or proportional to the numerical value of the punched openings 27, 28 and 29 on card 26 is imparted to analog machine 39. After the charge of the condensers 18 and 32 have been received by analog machine 39, switch 41 is opened, condenser 32 is discharged by throwing switch 34 to contact terminal 35 and condenser 18 is discharged by closing switch 24.

It is apparent to those skilled in the art that if switch 34 were closed against terminal 35 before closing switch 41, the same voltage would be imparted to analog machine 39.

From the above description, it is seen that the output or final voltage imparted to analog machine 39 is proportional to the decimal number 11 shown by binary number 1011 as encoded by openings 29, 28 and 27 on card 26. It will be recalled that the least significant figure indicated by opening 27 was placed in my converter, then the next least significant figure, etc. After each figure is imparted to my converter, the total previous input is divided by two and the next figure brought in as an addition, or in other words, each time condenser 18 is charged, the total charge thereon is then divided by two. Thus the final charge or voltage of condenser 18 is proportional to the number represented in binary form by the openings in card 26.

On the other hand, if a decimal system of digital machine is used, a card such as card 26 would be used wherein a portion of the card would be devoted to units, a portion to tens and a portion to hundreds, etc. The openings denoting the units would be so arranged as to be fed into digital machine 10 first, and would be followed by the tens, then hundreds, etc. In this instance, condenser 32 would be nine times the capacity of condenser 18.

Assume in the decimal system the number 283 were selected. Three openings would be punched in the units portion of the card, such as card 26, while eight openings would be punched in the tens portion and two in the hundreds portion. Thus, when the card is fed into digital machine 10, with the switch 21 closed, switch 34 against terminal 35, and switches 41 and 24 open, three successive pulses of equal time interval and voltage would store a quantity of charge on condenser 18 and this charge would be equivalent to the digit three. No switches are thrown until the unit portion of the card travels beneath brush 12, then switch 34 is thrown to terminal 37, thus discharging nine-tenths of the charge to condenser 32. Thereafter, the charge on condenser 32 is grounded by throwing switch 34 to terminal 35. The remaining charge on condenser 18 would be proportional to three-tenths.

Next, the tens portion of the card would pass beneath brush 12 and in this instance eight successive pulses would be fed to condenser 18. Thus the charge on condenser 18 would be equivalent to the digit eight plus the original charge of three-tenths or, in other words, the total charge would be proportional to the numeral eight and three-tenths. Switch 34 is then cycled again as described above to divide by ten the charge on the condenser 18, thereby leaving a charge proportional to eighty-three-hundredths.

The same procedure is followed for the hundreds portion of the card and a quantity of charge equivalent to two is added to the charge on condenser 18.

It should be clearly understood that the resulting charge on condenser 18 is now equivalent to the numeral 283 and it would still be proportional to this number if switch 34 were again cycled except that the remaining charge on condenser 18 is one-tenth the original value. This charge on condenser 18 is read as above, by closing switch 41 to oscilloscope 39 whereby a voltage proportional to the charge on condenser 18 is imposed on the Y-input thereof.

*Second embodiment*

In order to provide for automatic operation of the various switches of my invention and provide for automatic timing of the various cycles, the second embodiment as illustrated in Fig. 6 is shown as one means by which such automatic control may be accomplished.

In this embodiment, I have indicated the essential parts of a conventional Type 513 I.B.M. electric punched card accounting machine, manufactured by International Business Machines Corporation, New York, N.Y., as a rotating drum 100, a source of current such as battery 101, brushes 102, 103, 104, 105, 106 and punch magnets 107, 108, 109, 110, 111 which are grounded at 112. The above machine also has external patch cords 113, 114, 115, 116, 117 from which the pulses to operate my converter are taken. A conventional punched card 118, shown in Fig. 7, is adapted to be fed through the accounting machine to enable the accounting machine to provide the conventional digital pulses which are fed to my converter. Certain portions of punched card 118 are punched to provide for the operation of the switches of my machine as hereinafter described.

In Fig. 6, it is seen that a wire 119 leads from a source of D.C. current E while the other connection from source E is grounded at ground 112. In this embodiment, a substantially constant potential of 300 volts is supplied between wire 119 and ground 112. It will be readily understood that the particular potential described is by way of explanation only and does not indicate that only one particular voltage is suitable here.

Wire 119 supplies current through wires 120, 121, 122 and 123 to the coils 124, 125, 126 and 127, respectively, of four relays. Coils 124, 125, 126, 127 each have 10,000 ohms resistance and are each respectively provided with a .05 microfarad condenser in parallel with the coil to retard relay "chattering." Condensers for coils 124, 125, 126, 127 are respectively designated in Fig. 6 by numerals 128, 129, 130, 131. From coils 124, 125, 126, 127, wires 132, 133, 134, 135, respectively, lead to the plates of triodes 136, 137, 138, 139. The particular tube utilized as the above triodes is a 5963 tube. The cathode of the respective triodes 136, 137, 138, 139 have heating circuits; however, these circuits, as well as the other cathode heating circuits, are deleted in Fig. 6 for the purpose of clarity. The cathodes of triodes 136, 137, 138, 139 are respectively connected through resistors 140, 141, 142, 143 to ground 112. Resistors 140, 141, 142, 143 are each 6,800 ohms.

The grids of triodes 136, 137, 138, 139 are respectively connected through wires 144, 145, 146, 147 to plates of condensers 148, 149, 150, 151. The other plates of condensers 148, 149, 150, 151 are connected through wires 152, 153, 154, 155 to patch cords 114, 115, 116, 117, respectively, thereby receiving impulses from the digital accounting machine. Condensers 148, 149, 150, 151 are each .25 microfarad in capacity. Resistors 156, 157, 158, 159, which are each 120,000 ohms, are respectively connected from ground 112 to wires 144, 145, 146, 147. Thus, it is seen that the normal bias on the grids of triodes 136, 137, 138, 139 is zero, a value which does not permit sufficient plate current to flow in triodes 136, 137, 138, 139 to excite coils 124, 125, 126, 127; however, the grid voltage is made positive by a pulse flowing in the circuit of the accounting machine to which that grid is connected, and a current is allowed to flow in that triode.

It will be remembered that the plate circuits of the triodes 136, 137, 138, 139 are respectively connected to coils 124, 125, 126, 127, and hence the coil connected to the actuated triode is itself actuated by flow of current in the plate circuit. Coils 124, 125, 126, 127 are linked, respectively, in conventional relay fashion to switches 160, 161, 162, 163, the purposes of which will be described later.

In Fig. 6, it will be seen that I have provided a pair of univibrators which are conventionally called delay multivibrators, the function of which is described in detail on pages 81, 82 and 83 and illustrated on page 91 of "Electronics," by Elmore and Sands, copyrighted 1949 by the McGraw-Hill Book Company, Inc., and assigned to the Atomic Energy Commission.

One univibrator comprises a pair of triodes 164, 165, the cathodes of which are connected through resistor 166 to ground 112, and the plates of which are respectively connected through resistors 167, 168 to wire 119. Resistor 166 is 5,600 ohms, resistor 167 is 33,000 ohms and resistor 168 is 18,000 ohms.

The grid of triode 164 is connected to one plate of condenser 169, the other plate of which is connected through wire 170 to patch cord 113 to receive an impulse therefrom. The grid of triode 164 is also connected through resistor 171 to ground 112. Condenser 169 is .07 microfarad and resistor 171 is 47,000 ohms.

The grid of triode 165 is connected to one plate of condenser 172, the other plate of which is connected to the plate of triode 164. Also, the grid of triode 165 is connected through rheostat 173 to wire 119. Condenser 172 is .05 microfarad and rheostat 173 has a maximum value of one megohm.

The second univibrator comprises two triodes 174 and 175 with the cathode thereof connected through resistor 176 to ground 112. Resistor 176 is 8,200 ohms. The plate of triode 175 is connected through resistor 177 to wire 119 while the plate of triode 174 is connected through resistor 178 and the coil 179 in series to wire 119. In parallel with coil 179 is a resistor 180 and also in parallel with coil 179 and resistor 180 is a condenser 181 to retard current oscillation in coil 179. Resistor 177 is 23,500 ohms, resistor 178 is 8,200 ohms, resstor 180 is 82,000 ohms and condenser 181 is .005 microfarad.

The grid of triode 174 is connected to one plate of condenser 182, the other plate of which is connected to the plate of triode 164. The grid of triode 174 is also connected through resistor 183 to ground 112. Condenser 182 is .01 microfarad and resistor 183 is 220,000 ohms. The grid of triode 175 is connected to one plate of condenser 184, the other plate of which is connected to the plate of triode 174. Also connected to the grid of triode 175 is a rheostat 185 which is connected to wire 119. Condenser 184 is .25 microfarad and rheostat 185 has a maximum value of 5 megohms. The purpose of the first above described univibrator is to introduce a time delay between the time a pulse is transmitted from the accounting machine through wire 170 to actuate the two univibrators successively and the time a current flows in coil 179. The purpose of the second univibrator is to generate a uniform pulse to excite coil 179 for a predetermined length of time. The details of operation of the two univibrators is described in the above publication, as well as other publications and hence no detailed discussion of the same is presented.

As is customary in relays, coil 179 of the charging relay is adapted to close switch 186 when coil 179 is excited. A wire 187 leads from wire 119 to one side of switch 186 and a wire 188 leads from the other side of switch 186 through resistor 189 to one plate of charging condenser 190. The other plate of condenser 190 is grounded to ground 112. Resistor 189 is 47,000 ohms and charging condenser 190 is 2 microfarads.

Switch 163 is connected in parallel with condenser 190 by wires 191 and 192 so that upon closing of switch 163, condenser 190 is connected to the ungrounded plate of condenser 190. A wire 193 leads from wire 191 to a terminal 194 of switch 162 and thence to one side of switch 161. Switch 162 is a single pole double throw switch having a second terminal 195 which is grounded to ground 112 and the throw arm thereof connected to one plate of a weighting condenser 196, the other plate of which is grounded at 112. It is thus seen that weighting condenser 196 may be paralleled with charging condenser 190 by the throwing of switch 162 to terminal 194 or the condenser 196 may be discharged by throwing of switch 162 to terminal 195. Condenser 196 has a capacity of 2 microfarads.

A wire 197 leads from switch 161 and is connected to one plate of a storage condenser 198, the other plate of which is grounded at ground 112. To discharge condenser 198, switch 160 is arranged in parallel with condenser 198. Wire 197 also leads to one Y-input terminal of oscilloscope 199, while the other Y-input terminal of oscilloscope 199 is grounded at 112. Oscilloscope 199 is otherwise conventionally connected to provide a linear horizontal sweep.

Operation of second embodiment

From an examination of Fig. 6, it will be seen that each time brush 102 contacts drum 100, as card 118 passes through the accounting machine, a circuit is completed from battery 101, through drum 100 through brush 102, wire 113, punch magnet 107 back to the battery 101. Because of the voltage drop across magnet 107 and since battery 101 is grounded at ground 112 and the capacity of condenser 169 is sufficiently large, a difference in potential exists across resistor 171. This difference in potential is sufficient to start the time delay mechanism shown as the two univibrators and upon the expiration of a predetermined time, coil 179 is excited to close switch 186 for a predetermined time.

It will be understood by those skilled in the art that by variation of rheostat 173, the time delay between the time the pulse is given by brush 102 contacting drum 100 and the time switch 186 is closed may be adjusted. Further, the amount of time switch 186 is closed may be adjusted by varying rheostat 185.

Somewhat similar operations take place when any of brushes 103, 104, 105, 106 contact drum 100. For example, when brush 106 contacts drum 100, the difference in potential across punch magnet 111 is reflected by a difference in potential across resistor 159 which is sufficient to change the grid voltage on the grid of triode 139 and thus cause flow of current in the plate circuit which in turn excites coil 127 to close switch 163. Similarly when brush 104 contacts drum 100, switch 161 is closed and when brush 103 contacts drum 100, switch 160 is closed.

It will be understood that switches 186, 163, 161 and 160 are spring loaded and are normally held open except when closed by their respective coils. On the other hand, switch 162 is a single pole double throw switch which is adapted to alternately contact terminals 194 and 195. Normally switch 162 contacts terminal 195; however, upon excitation of coil 126, switch 162 is thrown to contact terminal 194.

Assume now that a series of cards such as card 118 are successively fed into the machine, the column 102-C passing beneath brush 102 contains the information to be transferred to the analog machine such as oscilloscope 199, the columns 103-C, 104-C, 105-C, 106-C passing respectively beneath brushes 103, 104, 105 and 106 contain standard punches for my converter whereby the various relays and switches for transferring and accumulating the information are contained. Each successive card fed through the accounting machine will have identically punched columns passing beneath brushes 103, 104, 105, 106, thus only the column passing beneath brushes 102 may have different punches.

In Fig. 7, it will be seen that the first punched portion which passes beneath the brushes is column 106-C which as described causes switch 163 to close, thus grounding condenser 190 or, in other words, discharging the condenser. This switch 163 is momentarily closed and then opened.

The next punched portions to pass under the brushes are in columns 102-C and 105-C. Here it should be noted that a hole is punched in column 105-C for every hole position in column 102-C. The holes in column 105-C pass under brush 105 to actuate switch 162 to alternately throw this switch from terminal 195 to 194. The holes in column 102-C pass under brush 102 and, with some time delay as described above, cause the closing of switch 186.

The next hole to pass under the brushes is the first hole in column 105-C which simply clears condenser 196 by causing the cycling of switch 162. Simultaneously, an opening in column 102-C may be positioned beneath brush 102 and after a short time delay, cause switch 186 to close to charge condenser 190 for a predetermined length of time. It should be remembered, however, that when switch 186 is closed, the time delay mentioned above is such that switch 162 will have cycled and is contacting terminal 195. Switch 186 opens before card 118 reaches its next position. When card 118 reaches the next position, the opening in column 105-C passes under brush 105 and causes switch 162 to contact terminal 194, thereby transferring one-half the charge from condenser 190 to condenser 196 and when that opening in column 105-C passes brush 105, switch 162 returns to contact terminal 195, thereby discharging condenser 196. By this time and if there is an opening in column 102-C at this position, switch 186 again closes for a predetermined time and then opens.

This cycle of charging condenser 190 each time a hole appears in column 102-C and then transferring one-half the charge on condenser 190 to condenser 196 continues throughout most of the travel of card 118 through the accounting machine. It will be noted that the last position in which column 102-C may be punched is also the last position in which column 105-C is punched and thus the last stage of charge on condenser 190 is not halved.

The last two positions of card 118 are not punched in column 102-C or 105-C but instead the next to last position is punched in column 103-C and the last position is punched in column 104-C. The opening in column 103-C causes brush 103 to contact drum 100 and thus causes switch 160 to close momentarily to discharge any charge on condenser 198. The opening in column 104-C next causes brush 104 to contact drum 100 to thereby cause closing momentarily of switch 161 to transfer a predetermined portion of the charge on condenser 190 to condenser 198 and to impart also a voltage proportional to the binary numeral in column 102-C of card 118 to the input of oscilloscope 199, thus causing a deflection in the Y-direction on the scope. Condenser 160 retains this charge until just prior to receiving the next charge denoted by column 102-C of the next successive card fed to the accounting machine. Prior to receiving this next successive charge, condenser 198 is grounded by cycling of switch 160 as described above.

In summation, condenser 190 receives a predetermined uniform charge each time an opening in column 102-C passes under brush 102. For each position available for punching in column 102-C, column 105-C has a punch which, through operation of switch 194, causes a paralleling of condensers 190 and 196 and the subsequent discharge of condenser 196. Thus, one-half the charge is retained by condenser 190. After the last input of charge to condenser 190, it is not paralleled with condenser 196 but switch 161 is momentarily closed and the charge on condenser 190 is shared with condenser 198. Further, the voltage across condenser 198 which voltage is a function of the total charge on condenser 190 is imparted to oscilloscope 199. The next card of course first "clears" condenser 190 by operating switch 163 and later follows the same procedure, "clearing" condenser 198 by closing switch 160 immediately prior to paralleling condensers 190 and 198 in the normal course of operation of that card.

It will be obvious to those skilled in the art that many variations may be made in the embodiments chosen for purpose of illustration without departing from the scope of my invention and it will be understood that the input to my machine could be of an analog nature, the operation of summing and fractionating described above, taking place in any desired order, without departing from the scope of my invention as defined by the appended claims.

I claim:

1. In apparatus for converting to an analog a number in a numbering system having a base B, said number having a series-coded digital pulse quantity notation in the form of no-quantity for zero-value digits and value-quantity for value digits, means for weighting digits of lesser significance comprising first and second quantity storage means having a quantity storage capability ratio equal to B-1, means for supplying the digits of said number in said digital pulse quantity notation as an input to said first quantity storage means in the inverse order of their significance, and switching means normally short-circuiting said second quantity storage means but operable after each digit input to divide the quantity stored in said first quantity storage means between said first and second quantity storage means according to said storage capability ratio.

2. In apparatus for converting to an analog voltage a number in a numbering system having a base B, said number having a series-coded digital pulse energy notation in the form of no-energy for zero-value digits and value-energy for value digits, means for weighting digits of lesser significance comprising first and second capacitors having a capacity ratio equal to B-1, means for supplying the digits of said number in said digital pulse energy notation as an input to said first capacitor in the inverse order of their significance, and switching means normally short-circuiting said second capacitor but operable after each digit input to divide the energy stored in said first capacitor between said first and second capacitors according to said capacity ratio.

3. Apparatus for converting to an analog a number in a numbering system having a base B, said number having a series-coded digital pulse quantity notation in the form of no-quantity for zero-value digits and valve-quantity for value digits, comprising first and second quantity storage means having a quantity storage capability ratio equal to B-1, means for supplying the digits of said number in said digital pulse quantity notation as an input to said first quantity storage means in the inverse order of their significance, switching means normally short-circuiting said second quantity storage means but operable after each digit input to divide the quantity stored in said first quantity storage means between said first and second quantity storage means according to said storage capability ratio, and means responsive to the total quantity stored in said first quantity storage means.

4. Apparatus for converting to an analog voltage a number in a numbering system having a base B, said number having a series-coded digital pulse energy notation in the form of no-energy for zero-value digits, and value-energy for value digits, comprising first and second capacitors having a capacity ratio equal to B−1, means for supplying the digits of said number in said digital pulse energy notation as an input to said first capacitor in the inverse order of their significance, switching means normally short-circuiting said second capacitor but operable after each digit input to divide the energy stored in said first capacitor between said first and second capacitor according to said capacity ratio, and means responsive to the total energy stored in said first capacitor.

5. Apparatus for converting to an analog a number in a numbering system having a base B, said number having a notation in the form of a train of pulse quantities, said train having groups of $n$ pulse quantities where $n$ equals any number of pulse quantities from zero to B−1, said apparatus comprising first and second quantity storage means having a predetermined quantity storage ratio, means for supplying the groups in said train to said first quantity storage means, means operable after each group input to share the quantity stored in said first quantity storage means between said first and second quantity storage means in accordance with said storage ratio, and means responsive to the total accumulation of quantities stored in said first quantity storage means for each train of pulse quantities.

6. Apparatus for converting to an analog a number in a numbering system having a base B, said number having a notation in the form of a train of pulse quantities in groups each representing a digit, each of said groups having $n$ pulse quantities where $n$ equals any number of pulse quantities from zero to B−1, said apparatus comprising first and second quantity storage means having a storage capability ratio equal to B−1, means for supplying groups in said train to said first quantity storage means in the inverse order of their digital significance, means operable after each group input to divide the quantity stored in said first quantity storage means between said first and second quantity storage means according to said storage capability ratio of B−1, and means responsive to the total accumulation of quantities stored in said first quantity storage means for each train input.

7. Apparatus for converting to an analog voltage a number in a numbering system having a base B, said number having a series-coded pulse notation in the form of a train of equal current pulses in groups each representing a digit, each of said groups having $n$ current pulses where $n$ equals any number of current pulses from zero to B−1, said apparatus comprising first and second capacitors having a capacity ratio equal to B−1, means for supplying the groups in said train to said first capacitor in the inverse order of their digital significance, means normally short-circuiting said second capacitor but operable after each group input to divide the current stored in said first capacitor between said first and second capacitors in proportion to said capacity ratio of B−1, and voltage responsive means for measuring the total current stored in said first capacitor after each train input.

8. The method of converting to an analog a number in a numbering system having a base B, said number having a notation in the form of a train of pulse quantities, said train having groups of $n$ pulse quantities where $n$ equals any number of pulse quantities from zero to B−1, including the steps of sequentially accumulating each group of $n$ pulse quantities of said train, dividing the total accumulation of group quantities by a predetermined number after each group input, and measuring the final accumulation of group quantities of said train.

9. The method of converting to an analog a number in a numbering system having a base B, said number having a notation in the form of a train of pulse quantities in groups each representing a digit, each of said groups having $n$ pulse quantities where $n$ equals any number of pulses from zero to B−1, including the steps of sequentially accumulating each group of $n$ pulse quantities of said train in the inverse order of their digital significance, removing a portion of the total accumulation of group quantities after each group accumulation so that the ratio of the removed portion to the remaining portion will equal B−1, and measuring the final accumulation of group quantities of said train.

10. The method of converting to an analog voltage a number in a numbering system having a base B, said number having a series-coded pulse digital notation in the form of a train of equal current pulses in groups each representing a digit, each of said groups having $n$ current pulses where $n$ equals any amount of current pulses from zero to B−1, including the steps of charging a capacitor by sequentially supplying each group in the inverse order of their digital significance, removing a portion of such charge after each group input so that the ratio of the removed portion to the remaining portion will be equal to B−1, and measuring the final charge on said capacitor after said train input.

References Cited in the file of this patent
UNITED STATES PATENTS

| | | |
|---|---|---|
| 2,729,812 | Jahn | Jan. 3, 1956 |
| 2,731,626 | Carolus | Jan. 17, 1956 |
| 2,760,134 | Johnson | Aug. 21, 1956 |